United States Patent
Benco et al.

(10) Patent No.: US 7,177,669 B2
(45) Date of Patent: Feb. 13, 2007

(54) NETWORK SUPPORT FOR NUMBER DIALED IDENTIFICATION WITH MULTI-LINE MOBILES

(75) Inventors: David S. Benco, Winfield, IL (US);
Kevin J. Overend, Elmhurst, IL (US);
Baoling S. Sheen, Naperville, IL (US);
Sandra L. True, St. Charles, IL (US);
Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 85 days.

(21) Appl. No.: 10/878,081

(22) Filed: Jun. 28, 2004

(65) Prior Publication Data

US 2005/0287996 A1    Dec. 29, 2005

(51) Int. Cl.
*H04M 1/00* (2006.01)
(52) U.S. Cl. .............. 455/567; 455/415; 455/566; 455/556.1
(58) Field of Classification Search .......... 455/415, 455/566, 567, 551
See application file for complete search history.

(56) References Cited

U.S. PATENT DOCUMENTS 5,448,622 A * 9/1995 Huttunen .................. 455/551
5,530,736 A * 6/1996 Comer et al. ............... 455/458
5,983,095 A   11/1999 Cameron et al.
2002/0094806 A1* 7/2002 Kamimura .................. 455/415
2002/0198007 A1* 12/2002 Zimmerman ............... 455/458

FOREIGN PATENT DOCUMENTS

| EP | 0 526 981 | 2/1993 |
|----|-----------|--------|
| EP | 0 647 075 | 4/1995 |

* cited by examiner

Primary Examiner—Temica Beamer

(57) ABSTRACT

Embodiments of the system, and method provide for identification of a number being dialed on an incoming call to a multi-line terminal. The method may have the steps of: receiving a call at a network, the call being for a multi-line terminal having at least two different numbers; checking a mobile subscriber database for a data entry indicative of the terminal being a multi-line mobile terminal; and presenting not only caller identification information to the called terminal, but also presenting the number that was dialed by the calling party so that a called party would know which of the at least two different numbers was being called. The multi-line terminal may be a multi-line mobile terminal that has at least two distinct and independent numbers assigned thereto.

15 Claims, 2 Drawing Sheets

NETWORK SUPPORT FOR NUMBER DIALED IDENTIFICATION WITH MULTI-LINE MOBILES

TECHNICAL FIELD

The present invention relates generally to telecommunication, and in particular to providing identification of a number being dialed on an incoming call to a multi-line terminal.

BACKGROUND OF THE INVENTION

Wireless communication systems are constantly evolving. System designers are continually developing greater numbers of features for both service providers as well as for the end users. In the area of wireless phone systems, cellular based phone systems have advanced tremendously in recent years. Wireless phone systems are available based on a variety of modulation techniques and are capable of using a number of allocated frequency bands. Available modulation schemes include analog FM and digital modulation schemes using Time Division Multiple Access (TDMA) or Code Division Multiple Access (CDMA). Each scheme has inherent advantages and disadvantages relating to system architecture, frequency reuse, and communications quality. However, the features the manufacturer offers to the service provider and which the service provider offers to the consumer are similar between the different wireless systems.

Regardless of the modulation scheme in use, the wireless phone available to the end user has a number of important features. Nearly all wireless phones incorporate at least a keyboard for entering numbers and text, and a display that allows the user to display text, dialed numbers, pictures and incoming caller numbers. Additionally, wireless phones may incorporate electronic phonebooks, speed dialing, single button voicemail access, and messaging capabilities, such as e-mail.

The features described above present only a sample of features that are capable of, or have already been, implemented into wireless phone systems. Any individual feature is capable of implementation into some or all of the wireless systems using the modulation schemes mentioned above.

Mobile subscribers are becoming increasingly connected to their mobile handsets which are often viewed as a necessary accessory during waking hours. Also, the line between work life and personal life is increasingly blurred due to the workplace demands on many employees, combined with longer hours, flex-time schedules, etc. In many circumstances, mobile subscribers share a single mobile handset for their work related business, their personal life and perhaps even a small personal business. There is thus an urgent need for this single multi-line mobile terminal to maintain separation between the respective telephone numbers, calling plans and billing arrangements, etc.

With the introduction of the multi-line mobile, however, there are some problems that arise when it comes to distinguishing which of the various lines or numbers on the multi-line mobile are being called. For example, the multi-line mobile user does not inherently know which number on his phone a calling party is dialing. Therefore, he may not know whether to answer an incoming call or not because he doesn't know which of the numbers the call is coming in on. This knowledge is important because it may not be appropriate to answer a personal call on the personal line during an active business meeting, but if the call came in on the business line, it may be important to answer the incoming call as it might be related to a meeting at hand, for example.

Because of these and other issues, there is a need that the telecommunications network support a feature that will provide a multi-line mobile user with not only an incoming caller identification, but also an identification of the mobile number that is being dialed by the calling party so that the called party (who is multi-line mobile user) can identify which of his mobile numbers is being called.

SUMMARY

The invention in one implementation encompasses a system. One embodiment of the system may have: a predetermined input command that is received at the network from the multi-line terminal, the predetermined input command causing the network to establish or be aware of multi-line capability of the terminal by a data entry maintained in a subscriber database; and the network having a call controller operatively connected to the subscriber database; wherein, in processing a call, the call controller presents not only caller identification information to the multi-line terminal, but may additionally present the number that was dialed by a calling party to the multi-line terminal so that a called party would know which of the multiple numbers was being called. The multi-line terminal may be a multi-line mobile terminal that has at least two distinct and independent numbers assigned thereto.

Another implementation of the present invention encompasses a method that may have the steps of: receiving a call at a network, the call being for a multi-line terminal having at least two different numbers; checking a mobile subscriber database for a data entry indicative of the terminal being a multi-line mobile terminal; and presenting not only caller identification information to the called terminal, but also presenting the number that was dialed by the calling party so that a called party would know which of the at least two different numbers was being called.

BRIEF DESCRIPTION OF THE DRAWINGS

Features of exemplary implementations of the invention will become apparent from the description, the claims, and the accompanying drawings in which:

DETAILED DESCRIPTION

The particular values and configurations discussed in these non-limiting examples can be varied and are cited merely to illustrate an embodiment of the present invention and are not intended to limit the scope of the invention.

With the introduction of multi-line mobile terminals, such as cell phones, there becomes a need to provide network support to the multi-line mobile user for distinguishing which of the various phone numbers are being called on the multi-line mobile phone. Embodiments of the present invention provide for the network to support the identification of the number being dialed on an incoming call to a multi-line mobile terminal in addition to the caller ID information associated with the calling party. The network is aware of the multi-line capability of a mobile handset by a data entry maintained in the mobile subscriber database. Terminating calls to the mobile handset may trigger the network to present not only caller identification information to the called party, but may additionally present the number that was dialed by the calling party so that the called party would know which of their multiple numbers was being called.

In general terms embodiments of the present system have the following elements. A mobile terminal operatively connected to a network. A predetermined input command for input at the terminal, the predetermined input command causing the network to establish or be aware of multi-line capability of the mobile terminal by a data entry maintained in a mobile subscriber database. The network has a call controller operatively connected to the subscriber database. In processing a call, the call controller may present not only caller identification information to the called party, but may additionally present the number that was dialed by the calling party so that the called party would know which of their multiple numbers was being called.

Although the present system and method may be used with any type of network (wired and wireless, for example), a subscriber may typically be a mobile subscriber who uses a mobile terminal (also referred to as mobile phone, a cell phone, mobile handset, or car phone).

In more specific terms, in processing a call, the call controller function, as part of its normal operation, would query the called party's subscriber information stored in a subscriber database, to determine the called party's terminal type (e.g. multi-line terminal versus single-line terminal). Upon determination that the called party has a multi-line terminal with more than one active number, the call controller function would connect the call and present the number that was dialed by the calling party in addition to the caller identification number.

Figure 1:
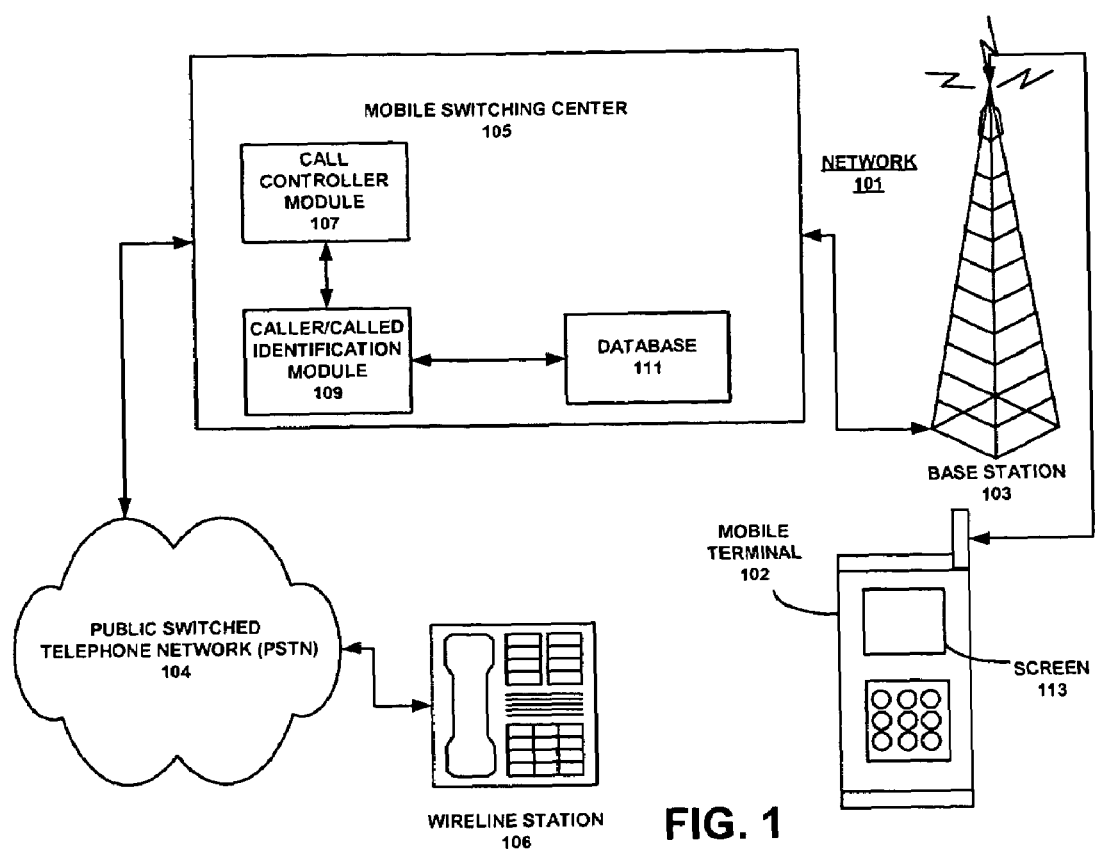
FIG. 1 depicts a block diagram that illustrates elements of a system according to one embodiment for identification of a number being dialed on an incoming call to a multi-line terminal.

In the FIG. 1 embodiment a network 101 is operatively connected to at least one mobile terminal 102. As is known the network 101 may have at least one base station 103, which is operatively connected to a mobile switching center 105, wirelessly coupled to the mobile terminal 102. The mobile switching center 105 in the network 101 may also have a call control module 107 operatively connected to base station 103 and to a caller/called identification module 109. A database 111 may also be operatively connected to the caller/called identification module 109.

The network 101 may be, or may be part of, one or more of a telephone network, a local area network ("LAN"), the Internet, and a wireless network. In the depicted embodiment, a public switched telephone network (PSTN) 104 is connected to the mobile switching center 105. The PSTN 104 routes calls to and from mobile users through the mobile switching center 105. The PSTN 104 also routes calls from and to wireline stations 106. The PSTN 104 generally may be implemented as the worldwide voice telephone network accessible to all those with telephones and access privileges (e.g., AT&T long distance network).

The caller/called identification module 109 allows the network 101 to recognize that when a call is placed to a particular mobile terminal 109 that has two or more distinct and independent numbers, the dialed number should be presented to the multi-line mobile terminal in addition to the caller identification information. This information may be displayed on the screen 113 of the mobile terminal 102.

Figure 2:
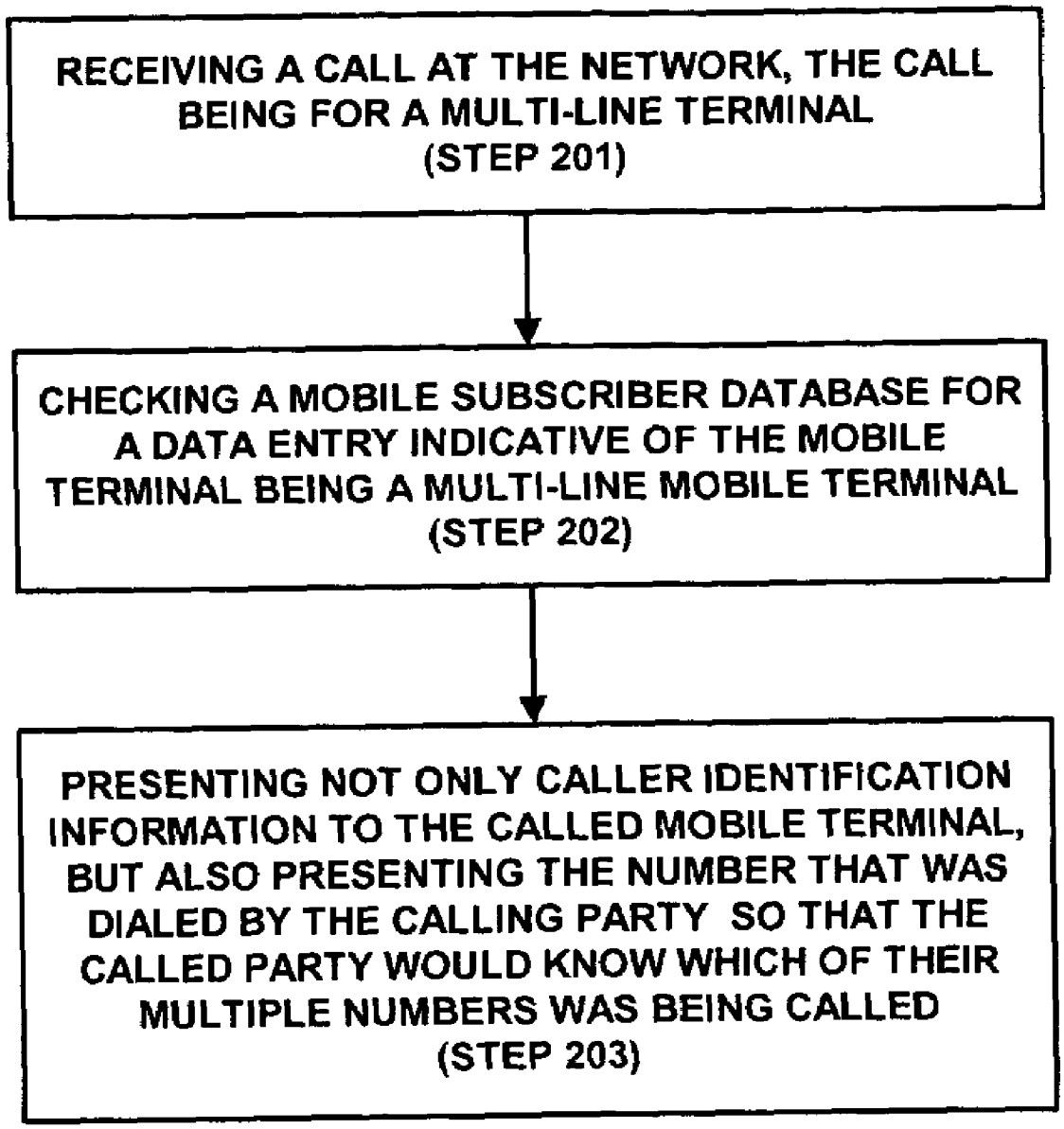
FIG. 2 illustrates a very general flow chart of logical operational steps that may be followed in accordance with one embodiment of the present method and system.

Referring to FIG. 2, one embodiment is depicted of a method for identification of a number being dialed on an incoming call to a multi-line mobile terminal, in addition to the caller ID information associated with the calling party. Such an embodiment may have the steps of: receiving a call at the network, the call being for a multi-line terminal (step 201); checking a mobile subscriber database for a data entry indicative of the mobile terminal being a multi-line mobile terminal (step 202); and presenting not only caller identification information to the called mobile terminal, but also presenting the number that was dialed by the calling party (step 203) so that the called party would know which of their multiple numbers was being called.

Therefore, the improved present method and system overcomes the drawbacks of the prior art, such as, wherein the current Automatic Number Identification (ANI) and Calling Name Presentation (CNAP) functionality provides limited control to an end user/operator of what is displayed at the called party device.

A methodology for the network to recognize that when a call is placed to a particular mobile handset that has two or more distinct and independent numbers, the dialed number should be presented to the multi-line mobile user in addition to the caller identification information.

Thus embodiments of the present system and method fulfill a need in the prior art such that the telecommunications network supports a feature that provides a multi-line mobile user with not only an incoming caller identification, but also an identification of the mobile number that is being dialed by the calling party so that the called party (who is multi-line mobile user) can identify which of his mobile numbers is being called.

The present system and method may be used with non-mobile phones and terminals, as well as, mobile phones and mobile terminals. Also, different types of data storage devices may be used with the present method and system. For example, a data storage device may be one or more of a magnetic, electrical, optical, biological, and atomic data storage medium.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method for identification of a number being dialed on an incoming call to a multi-line terminal, comprising the steps of:
   receiving a call at a network, the call being for a multi-line terminal having at least two different numbers;
   checking a mobile subscriber database for a data entry indicative of the terminal being a multi-line mobile terminal;
   preparing, by a call controller in the network, caller identification and a number that was dialed by the calling party for display at the multi-line mobile terminal; and
   presenting not only caller identification information to the called terminal, but also presenting the number that was dialed by the calling party so that a called party knows which of the at least two different numbers is being called, both the caller identification and the number that was dialed by the calling party displayed at the terminal;

wherein a caller/called identification module in the network allows the network to present, when a call is placed to a terminal that has two or more distinct and independent numbers, the dialed number to the multi-line terminal in addition to the caller identification information.

2. The method according to claim 1, wherein the multi-line terminal is a multi-line mobile terminal that has at least two distinct and independent numbers assigned thereto.

3. The method according to claim 1, wherein the method further comprises querying a called party's subscriber information stored in a subscriber database to determine a terminal type of the called party's terminal.

4. The method according to claim 3, wherein the terminal type is a multi-line terminal.

5. The method according to claim 3, wherein the network supports identification of a number being dialed on an incoming call to a multi-line mobile terminal in addition to caller ID information associated with a calling party.

6. A system that provides for identification of a number being dialed on an incoming call to a multi-line terminal, comprising:
a multi-line terminal operatively connected to a network;
a predetermined input command that is received at the network from the multi-line terminal, the predetermined input command causing the network to establish or be aware of multi-line capability of the terminal by a data entry maintained in a subscriber database; and
the network having a call controller operatively connected to the subscriber database via caller/called identification module;
wherein, in processing a call, the call controller via the caller/called identification module presents caller identification information to the multi-line terminal and presents a number that was dialed by a calling party to the multi-line terminal so that a called party knows which of the multiple numbers is being called;
the terminal having a screen for displaying both the caller identification and the number that was dialed by the calling party;
wherein the caller/called identification module in the network allows the network to present, when a call is placed to a terminal that has two or more distinct and independent numbers, the dialed number to the multi-line terminal in addition to the caller identification information.

7. The system according to claim 6, wherein the caller/called identification module allowing the network to recognize, when a call is placed to a particular mobile terminal, that the mobile terminal has a plurality of distinct and independent numbers.

8. The system according to claim 6, wherein the multi-line terminal is a multi-line mobile terminal that has at least two distinct and independent numbers assigned thereto.

9. The system according to claim 6, wherein the system supports identification of a number being dialed on an incoming call to a multi-line mobile terminal in addition to caller ID information associated with a calling party.

10. A method for identification of a number being dialed on an incoming call to a multi-line terminal, comprising the steps of:
receiving a call for a called party at a network;
querying a called party's subscriber information stored in a subscriber database in the network to determine a terminal type of the called party's terminal;
identifying the called party's terminal type as a multi-line mobile terminal that has at least two distinct and independent numbers assigned thereto;
preparing, by a call controller in the network, caller identification and a number that was dialed by the calling party for display at the multi-line mobile terminal; and
presenting not only caller identification information to the called terminal, but also presenting the number that was dialed by the calling party so that a called party knows which of the at least two different numbers is being called, both the caller identification and the number that was dialed by the calling party displayed at the terminal;
wherein a caller/called identification module in the network allows the network to present, when a call is placed to a terminal that has two or more distinct and independent numbers, the dialed number to the multi-line terminal in addition to the caller identification information.

11. The method according to claim 10, wherein the multi-line terminal is a multi-line mobile terminal that has at least two distinct and independent numbers assigned thereto.

12. The method according to claim 10, wherein the network supports identification of a number being dialed on an incoming call to a multi-line mobile terminal in addition to caller ID information associated with a calling party.

13. A system that provides for identification of a number being dialed on an incoming call to a multi-line terminal, comprising:
a network having a subscriber database and a caller/called identification module;
a multi-line terminal operatively connected to network;
a predetermined input command that is received at the network from the multi-line terminal, the predetermined input command causing the network to establish a multi-line capability of the terminal by a data entry maintained in the subscriber database; and
the network having a call controller operatively connected to the subscriber database via caller/called identification module;
wherein, in processing a call, the call controller via the caller/called identification module presents caller identification information to the multi-line terminal and presents a number that was dialed by a calling party to the multi-line terminal so that a called party knows which of the multiple numbers is being called;
the terminal having a screen for displaying, without modification, both the caller identification and the number that was dialed by the calling party;
wherein the caller/called identification module in the network allows the network to present, when a call is placed to a terminal that has two or more distinct and independent numbers, the dialed number to the multi-line terminal in addition to caller identification information.

14. The system according to claim 13, wherein the multi-line terminal is a multi-line mobile terminal that has at least two distinct and independent numbers assigned thereto.

15. The method according to claim 13, wherein the network supports identification of a number being dialed on an incoming call to a multi-line mobile terminal in addition to caller ID information associated with a calling party.

* * * * *